(12) United States Patent
Ishikawa

(10) Patent No.: US 8,284,252 B2
(45) Date of Patent: Oct. 9, 2012

(54) ACTION ESTIMATING APPARATUS, METHOD FOR ESTIMATING OCCUPANT'S ACTION, AND PROGRAM

(75) Inventor: Takahiro Ishikawa, Nagoya (JP)

(73) Assignee: DENSO CORPORATION, Kariya (JP)

( * ) Notice: Subject to any disclaimer, the term of this patent is extended or adjusted under 35 U.S.C. 154(b) by 406 days.

(21) Appl. No.: 12/643,018

(22) Filed: Dec. 21, 2009

(65) Prior Publication Data
US 2010/0157059 A1    Jun. 24, 2010

(30) Foreign Application Priority Data
Dec. 22, 2008   (JP) ................................ 2008-325660

(51) Int. Cl.
*H04N 21/414* (2011.01)
(52) U.S. Cl. ......................... 348/148; 348/143
(58) Field of Classification Search ........................ None
See application file for complete search history.

(56) References Cited

U.S. PATENT DOCUMENTS

| 2005/0157908 A1* | 7/2005 | Matsugu et al. ............. 382/107 |
| 2006/0056655 A1* | 3/2006 | Wen et al. .................... 382/103 |
| 2008/0130953 A1* | 6/2008 | Ishikawa ....................... 382/103 |
| 2009/0034794 A1  | 2/2009 | Ishikawa |

FOREIGN PATENT DOCUMENTS

| JP | A-6-213632   | 8/1994 |
| JP | 2005-063090 A | 3/2005 |
| JP | 2005-205943 A | 8/2005 |
| JP | 2008-206868   | 8/2008 |
| JP | 2009-069975 A | 4/2009 |

* cited by examiner

Primary Examiner — Mehrdad Dastouri
Assistant Examiner — James Anderson, II
(74) Attorney, Agent, or Firm — Posz Law Group, PLC

(57) ABSTRACT

A detection unit obtains a position of a feature point of an occupant. A storage unit stores a model of all specific actions in each of physical feature classifications. The model defines a position or a locus of the feature point in each specific action, which an occupant may perform. A determining unit compares an in-action feature point with each model of a specific action, which is being performed, to determine a classification conformity weight indicating a possibility that the occupant belongs to the physical feature classification. An estimating unit compares the position of the feature point with each model to obtain a comparison result and generate a conformity value by incorporating the classification conformity weight into the comparison result. The estimating unit detects an estimated action, which is a specific action corresponding to the model, which has a highest conformity value.

13 Claims, 6 Drawing Sheets

FIG. 7

| CONTENTS | TIME POINT | | |
|---|---|---|---|
| IG CONTINUOUS MANIPULATION | T1-T2 | | |
| SHIFT LEVER CONTINUOUS MANIPULATION | T3-T4 | | |
| STEERING CONTINUOUS MANIPULATION | T5-T6 | T7-T8 | T9-T10 |
| ⋮ | | | |
| AC CONTINUOUS MANIPULATION | T11-T12 | | |

ACTION ESTIMATING APPARATUS, METHOD FOR ESTIMATING OCCUPANT'S ACTION, AND PROGRAM

CROSS REFERENCE TO RELATED APPLICATIONS

This application is based on and incorporates herein by reference Japanese Patent Application No. 2008-325660 filed on Dec. 22, 2008.

FIELD OF THE INVENTION

The present invention relates to an action estimating apparatus configured to estimate an action of an occupant of a movable object. The present invention further relates to a program configured to be executed by a computer, as a section of the action estimating apparatus. The present invention further relates to a method for estimating an occupant's action.

BACKGROUND OF THE INVENTION

For example, JP-A-2005-205943 discloses an action estimating apparatus mounted in a vehicle for estimating an action performed by an occupant of the vehicle. The action estimating apparatus of JP-A-2005-205943 includes an image device and an image processing device. The image device obtains a photograph including a driver. The image processing device determines existence of a dangerous action based on the photograph obtained by the image device. The dangerous action is, for example, an action (telephone use action) for using a cellular phone when a driver is driving the vehicle. In the image processing device, a predetermined region, in which a hand of a driver is located at a high possibility in the telephone use action, is beforehand set around the face of the driver in a photographic image. When the hand is continually located in the predetermined region of the photographic image for a predetermined time period or more, it is determined that the driver is performing the telephone use action. In addition to the telephone use action, the dangerous action may further include lifting of a hand from a steering wheel to manipulate an air-conditioner or a navigation device and lifting of a hand from a steering wheel to swing a shoulder and an arm. However, the action estimating apparatus of JP-A-2005-205943 only determines whether the telephone use action is performed according to a position of a hand in a photographic image. Thus, even when a driver performs a dangerous action other than the telephone use action, the action estimating apparatus cannot detect the dangerous action.

SUMMARY OF THE INVENTION

In view of the foregoing and other problems, it is an object of the present invention to produce an action estimating apparatus in which detection accuracy of an estimated action is enhanced. It is another object of the present invention to produce a method for estimating an occupant's action.

In view of JP-A-2005-205943, the inventor of the present application proposes an action estimating apparatus in Japanese patent application 2007-203111. The action estimating apparatus includes an image processing device. Specifically, in the Japanese patent application 2007-203111, an action estimation model is prepared beforehand. In the action estimation model, a position or a locus of a feature point such as a person's wrist and an elbow obtained in a specific action is assigned to all of specific actions, which a driver may perform in a vehicle interior. Each of the action estimation models is compared with the position or the locus of the feature point detected from a photographic image. The image processing device detects an estimated action according to a degree of conformity between the action estimation model and the position or the locus of the feature point. The estimated action is an action, which may be done by an occupant at a highest possibility.

The action estimation model is, in general, created to coincide with majority people. However, there is an individual difference in a detailed manner of a specific action and a feature of a body such as the length of a hand. Accordingly, there is a person who does not conform to the action estimation model. Therefore, when such a person performs a specific action, the currently performed specific action may not be correctly detected. For example, a currently performed action may be recognized as another specific action. Alternatively, even when a person does not perform a specific action, an erroneous detection of a specific action may occur. It is conceived that decrease in detection accuracy of an estimated action may occur due to individual difference between occupants.

According to one aspect of the present invention, an action estimating apparatus comprises an image acquisition unit configured to repeatedly obtain a photographic image of an occupant of a movable object. The action estimating apparatus further comprises a feature point detection unit configured to obtain feature point data indicating a position of a feature point of the occupant in the photographic image in response to obtaining of the photographic image by the image acquisition unit, the feature point being at least one predetermined point of a person's body. The action estimating apparatus further comprises a model storage unit configured to store action estimation models of all specific actions in each of at least two predetermined classifications specified according to a person's physical feature, each of the action estimation models defining a position or a locus of the feature point in each of the specific actions, which an occupant may perform. The action estimating apparatus further comprises a definite action detecting unit configured to detect that a definite action is being performed by the occupant using a method different from comparison between the feature point data and the action estimation models, the definite action being at least one of the specific actions specified beforehand. The action estimating apparatus further comprises a weight determining unit configured to compare an in-action feature point with each of the action estimation models of the definite action and determine a classification conformity weight indicating a possibility that the occupant belongs to one of the classifications, which include the action estimation models, such that the classification conformity weight increases as a degree of coincidence increases, the in-action feature point being the feature point data obtained by the feature point detection unit while the definite action detecting unit detects the definite action. The action estimating apparatus further comprises an action estimating unit configured to: compare the feature point data detected by the feature point detection unit with each of the action estimation models stored in the model storage unit to obtain a comparison result as a comparison coincidence degree; and detect an estimated action, which is a specific action corresponding to one of the action estimation models, which has a highest conformity value, the conformity value being obtained by incorporating the classification conformity weight determined by the weight determining unit into the comparison coincidence degree.

According to another aspect of the present invention, an action estimating apparatus comprises an acquisition unit configured to repeatedly obtain a photographic image of an occupant of a movable object. The action estimating apparatus further comprises a detection unit configured to obtain a position of a feature point of the occupant in the photographic image. The action estimating apparatus further comprises a storage unit configured to store models of all specific actions in each of predetermined classifications specified according to a person's physical feature, each of the models defining a position or a locus of the feature point in each of the specific actions, which an occupant may perform. The action estimating apparatus further comprises an action detecting unit configured to detect that a specific action is being performed as a definite action. The action estimating apparatus further comprises a determining unit configured to compare the position of the feature point obtained when the definite action is being performed with each of the models and determine a classification conformity weight indicating a possibility that the occupant belongs to one of the classifications. The action estimating apparatus further comprises an action estimating unit configured to: compare the feature point data detected by the feature point detection unit with each of the action estimation models stored in the model storage unit to obtain a comparison result as a comparison coincidence degree; and detect an estimated action, which is a specific action corresponding to one of the action estimation models having a highest conformity value, the conformity value being obtained by incorporating the classification conformity weight determined by the weight determining unit into the comparison coincidence degree.

According to another aspect of the present invention, a method for estimating an occupant's action, the method comprises repeatedly obtaining a photographic image of an occupant of a movable object. The method further comprises obtaining feature point data indicating a position of a feature point of the occupant in the photographic image in response to obtaining of the photographic image, the feature point being at least one predetermined point of a person's body. The method further comprises detecting that a definite action is being performed by the occupant, the definite action being at least one of predetermined specific actions, which an occupant may perform. The method further comprises comparing an in-action feature point with each of action estimation models of the definite action and determining a classification conformity weight indicating a possibility that the occupant belongs to one of predetermined classifications, which include the action estimation models, such that the classification conformity weight increases as a degree of coincidence increases, the in-action feature point being the feature point data obtained when detecting that the definite action is being performed, wherein the action estimation models are specified for all specific actions in each of the classifications according to a person's physical feature to define a position or a locus of the feature point in each of the specific actions and stored. The method further comprises comparing the detected feature point data with each of the stored action estimation models to obtain a comparison result as a comparison coincidence degree. The method further comprises detecting an estimated action, which is one of the specific actions corresponding to the action estimation model having a highest conformity value, the conformity value being obtained by incorporating the classification conformity weight determined by the weight determining unit into the comparison coincidence degree.

BRIEF DESCRIPTION OF THE DRAWINGS

The above and other objects, features and advantages of the present invention will become more apparent from the following detailed description made with reference to the accompanying drawings. In the drawings:

FIG. 7 is an explanatory view showing a definite action information;

DETAILED DESCRIPTION OF PREFERRED EMBODIMENTS

Figure 1:
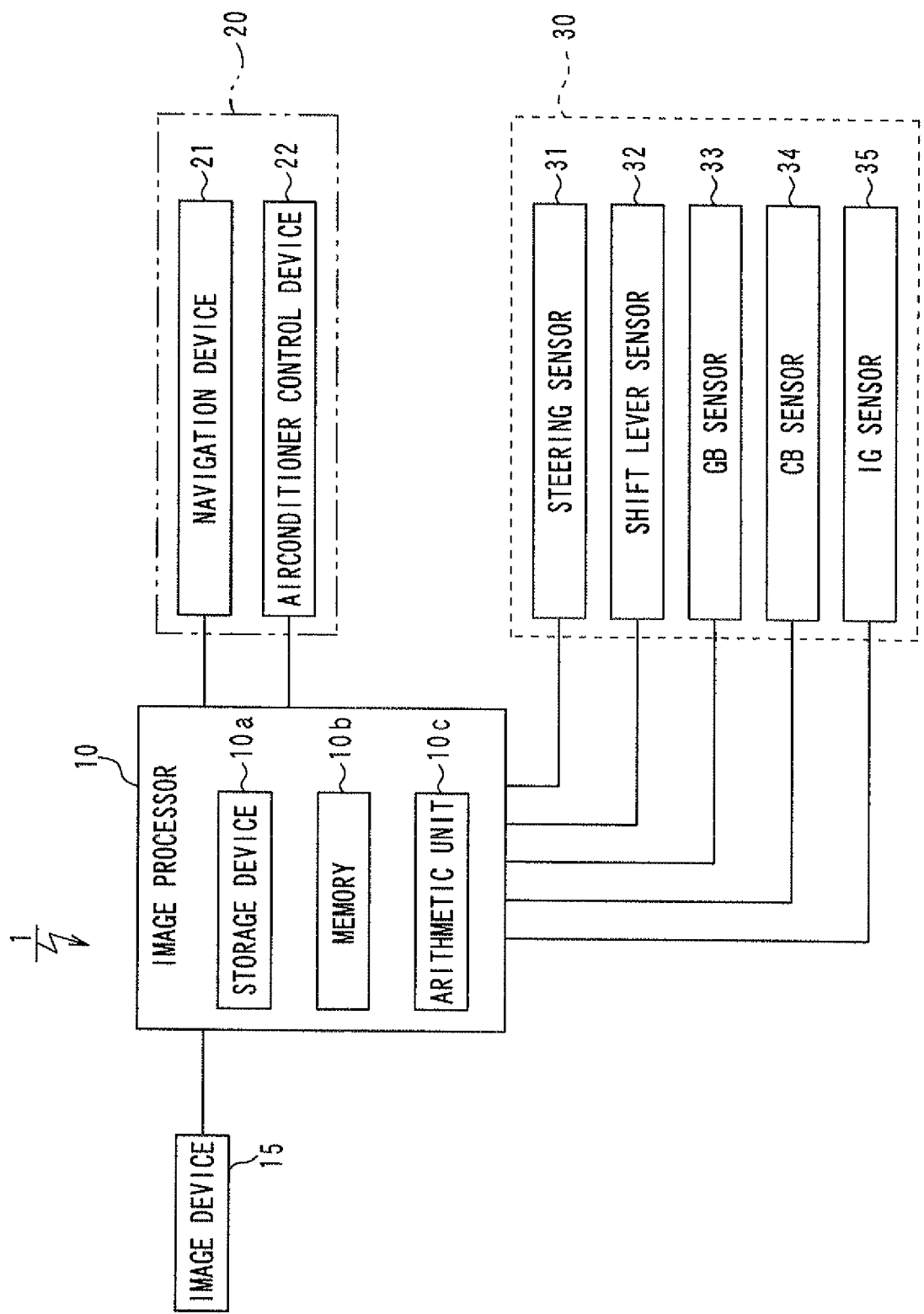
FIG. 1 is a block diagram showing an action estimating apparatus.

FIG. 1 is a block diagram showing an overview of an action estimation system mounted in a vehicle such as an automobile. Below, the vehicle mounted with an action estimation system 1 is specified as a self-vehicle.

(Structure)

As shown in FIG. 1, the action estimation system 1 includes an image device 15 for obtaining an image of at least a driver as an image object and an image processor 10 for processing the image obtained by using the image device 15 so as to estimate an action of the driver. Further, in the action estimation system 1, a controlled device group 20 is connected to the image processor 10. The controlled object device group 20 includes multiple devices in the self-vehicle.

The controlled device group 20 includes a navigation device 21, which performs generally-known route guidance and the like, and an airconditioner control device 22, which controls an airconditioner for controlling air conditioning in an interior of the vehicle.

A navigation device 21 is a generally-known device including an instruction portion (navigation instruction portion), a speaker, a display device, and a control device. The navigation instruction portion includes devices such as a mechanical button and a touch panel for accepting input of an instruction of a user. The control device performs route guidance to a destination according to an instruction inputted by using the navigation instruction portion. The navigation device 21 controls the speaker and the display device according to an instruction from the image processor 10.

The airconditioner control device 22 includes an instruction portion (AC instruction portion) and a control device. The AC instruction portion includes devices such as a mechanical button and a touch panel for accepting input of an instruction of a user. The control device controls the airconditioner according to an instruction inputted by using the AC instruction portion. The airconditioner control device 22 further performs a cool air blowing control for controlling cool air blown from the airconditioner control device to a driver according to a control instruction from the image processor 10.

The image device 15 is, for example, a generally-known digital camera for repeatedly outputting an image (photographic image) at a predetermined interval. The image device 15 is mounted such that a lens is directed toward a vehicle interior so as to obtain an image including at least a driver seated on a driver's seat and a manipulation device group including multiple devices in the vehicle interior.

In the present embodiment, the manipulation devices of the manipulation device group include a rearview mirror, a passenger seat, and an air outlet (air outlet of a blower at the right side and/or the left side) of the airconditioner, the navigation instruction portion, the AC instruction portion, a steering wheel, a shift lever, and the like. The manipulation devices may further include at least a glove box (GB) for accommodating items and a console box (CB).

(Image Processor)

As follows, the image processor will be described.

The image processor 10 includes a generally-known microcomputer as a main component. The microcomputer of the image processor 10 includes a storage device 10a such as a flash memory, a memory 10b, and an arithmetic unit 10c. The storage device 10a is a rewritable medium configured to hold a stored content even when power supply is terminated. The memory 10b temporarily stores data caused in the course of a processing. The arithmetic unit 10c executes a program stored in the storage device 10a and the memory 10b.

The storage device 10a stores a program configured to successively perform an image processing of an image obtained by the image device 15 for causing the arithmetic unit 10c to perform an action estimating operation to estimate an action of a driver and for controlling the controlled device group 20 according to a result of the estimation.

Further, the storage device 10a stores a feature list, which is referred to when the arithmetic unit 10c performs the action estimating operation, and multiple action estimation models.

The feature list is for detecting a feature point from a driver in an obtained image. The feature point is predetermined on a human body. The feature list includes at least an arm list and a head list. The arm list is used for detecting the feature point predetermined for an arm of a human body. The head list is used for detecting the feature point predetermined for a head, in particular, a face of a human body.

The arm list includes feature points of a human body containing at least the right shoulder, the left shoulder, the right elbow, the left elbow, the right wrist, and the left wrist. The head list includes feature points of a human body containing at least a nose, an inner corner of a right eye, an inner corner of a left eye, an outer corner of a right eye, an outer corner of a left eye, a right corner of a mouth, a left corner of a mouth, a right tragion, and a left tragion.

<Action Estimation Model>

As follows, the action estimation model will be described.

Figure 2:
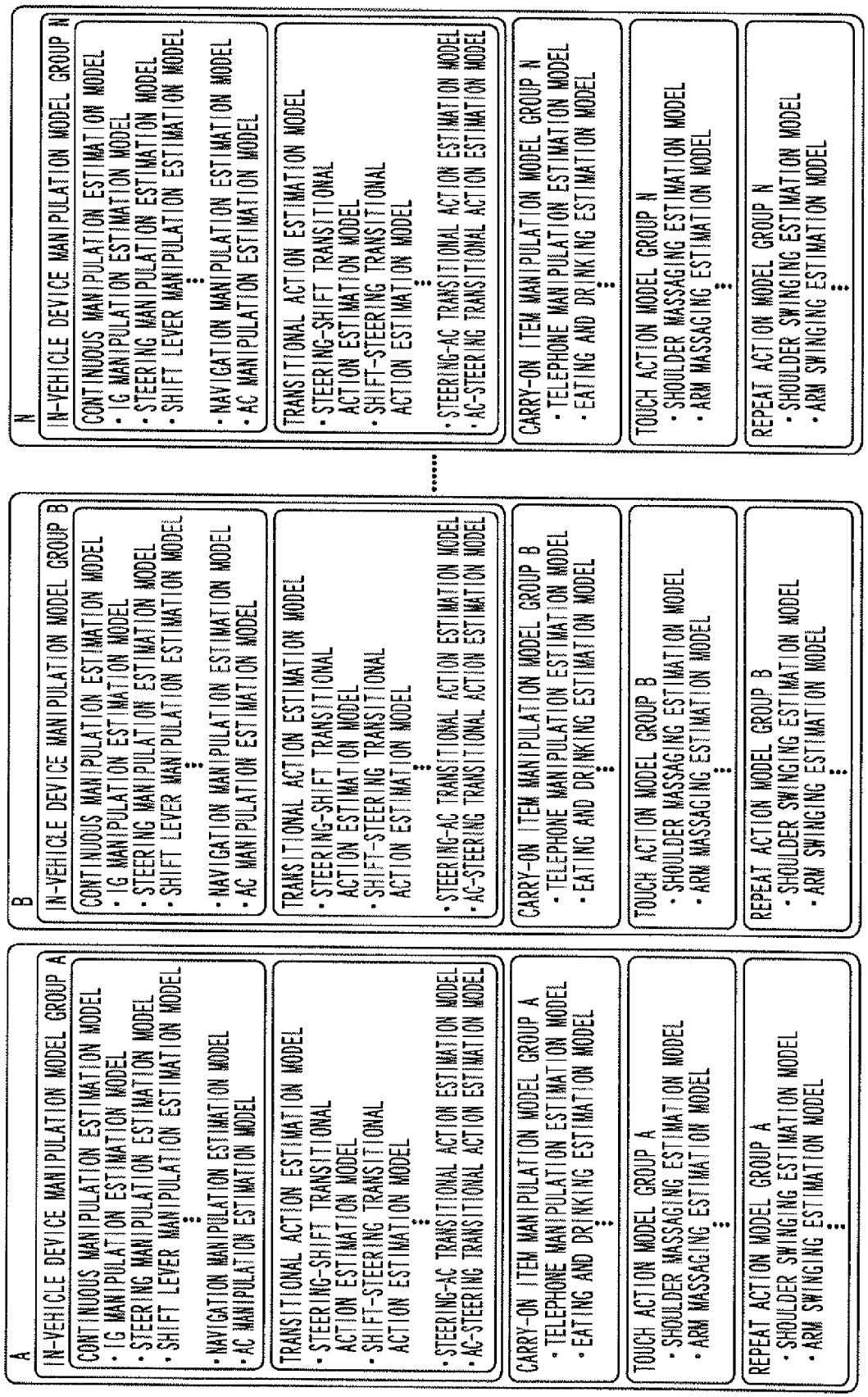
FIG. 2 is an explanatory view showing the action estimation model stored in a storage device.

FIG. 2 is an explanatory view showing an action estimation model stored in the storage device 10a.

The action estimation model is prepared by beforehand modeling a position and a locus of the feature point when a driver performs a predetermined specific action. The action estimation model is prepared for each of predetermined specific actions, which a driver may perform.

Each of all the action estimation models respectively corresponding to each of the specific actions is beforehand generated for each of N classifications beforehand set according to a human body feature of a person. N is an integer greater than equal to two. In present embodiment, the human body feature is the height of a person. Specifically, test subjects are classified according to predetermined N classifications (height classification). Then, each of the action estimation models in each of the classifications is beforehand generated from specific actions performed by all the test subjects belonging to each of the classifications.

As shown in FIG. 2, each action estimation model corresponding to each specific action is generated for each of classifications A to N and stored in the storage device 10a.

The action estimation model is classified into an in-vehicle device manipulation model, a carry-on device manipulation estimation model, a touch action estimation model, and a repeat action estimation model, according to contents of the specific action.

The in-vehicle device manipulation model is obtained by modeling an action for operating the manipulation device group as a specific action. The in-vehicle device manipulation model is classified into a continuous manipulation estimation model and a transitional action estimation model, according to contents of the specific action.

The continuous manipulation estimation model is obtained by modeling a continuous manipulation of one device of the manipulation device group continually by a driver for more than a predetermined period, as a specific action. The continuous manipulation estimation model specifies a stationary position (locus) of each feature point, which exists in manipulation of a manipulation device, for each manipulation device. Below, names of the continuous manipulation and the continuous manipulation estimation model for each manipulation device are denoted by "manipulation device name+continuous manipulation" or "manipulation device name+continuous manipulation estimation model." For example, in a case where the manipulation device is an ignition mechanism (IG mechanism), the names of the continuous manipulation and the continuous manipulation estimation model are denoted by an ignition mechanism continuous manipulation and an ignition mechanism continuous manipulation estimation model.

On the other hand, the transitional action estimation model is obtained by modeling a transitional action, when a driver moves a hand or the like from one manipulation device to another manipulation device, as a specific action. The transitional action estimation model specifies a start position, from which movement starts, an end position, at which movement ends, and a moving path (locus) from the start position to the end position for each feature point. Below, names of the transitional action and the transitional action estimation model are denoted by a combination of "a manipulation device name, from which movement starts, to a manipulation device name, at which the movement ends, +transitional action" and a combination of "a manipulation device name, from which movement starts, to a manipulation device name, at which the movement ends, +transitional action estimation model." For example, in a case where a manipulation device, from which movement starts, is the steering wheel and a manipulation device, at which the movement ends, is a shift lever, the transitional action and the transitional action estimation model are denoted by a steering wheel to shift lever transitional action, and a steering wheel to shift lever transitional action estimation model.

The carry-on item manipulation estimation model is obtained by modeling a manipulation of a carry-on item as a specific action. Specifically, the manipulation of a carry-on item is manipulation of a carry-on item carried in a vehicle interior. The manipulation of a carry-on item is, for example, eating, drinking, smoking, use of a telephone, and the like. The carry-on item manipulation estimation model specifies a target point, a return region, a pass-by region, and a detection allowable range. To the target point, each feature point of a driver, who manipulated a carry-on item, returns. In the return region, each feature point of a driver who can be deemed to have manipulated the carry-on item, is located. Through the pass-by region, each feature point of a driver, who is going to manipulate a carry-on item, passes. The detection allowable range defines a region in which each feature point of a driver, who is going to manipulate a carry-on item, passes through the pass-by region in a movable direction. Below, a name of each carry-on item manipulation estimation model is denoted by a combination of "carry-on item manipulation name+estimation model." For example, when a telephone as a carry-on item is manipulated, the carry-on item manipulation estimation model is denoted by a telephone manipulation estimation model.

The touch action estimation model is obtained by modeling a touch action as a specific action. Specifically, the touch action estimation model is obtained by modeling a touch action of a driver to touch the driver's own body by hand when massaging a shoulder and an arm, for example. A specific action of the touch action estimation model is different from a corresponding specific action of the carry-on item manipulation estimation model. However, a structure of the touch action estimation model is similar to a structure of the carry-on item manipulation estimation model. Specifically, the touch action estimation model specifies the target point, the return region, the pass-by region, and the detection allowable range. Detection of an estimated action using the touch action estimation model is performed similarly to detection of an estimated action using the carry-on item manipulation estimation model. Accordingly, specific explanation of detection of a touch action is omitted.

The repeat action estimation model is obtained by modeling a repeat action as a specific action. Specifically, the repeat action estimation model is obtained by modeling a repeat action such as swinging of an arm and swinging of a shoulder, without using a device or an item. The repeat action estimation model specifies multiple allowable regions, in which continually changing each feature point of a driver, who is performing a repeat action, may be located, and a center point (specific point) of each allowable region. Below, a name of each repeat action manipulation estimation model is denoted by a combination of "repeat action+estimation model." For example, when a repeat action is swinging of a shoulder (shoulder swing), the name of a repeat action estimation model is a shoulder swing estimation model.

As described above, the image processor 10 performs image processing of feature point data detected from the image obtained from the image device 15. Further, the image processor 10 compares the feature point data with each action estimation model. Thus, the image processor 10 detects the specific action, which corresponds to the action estimation model satisfying a condition, as an estimated action of a driver.

<Sensor Group>

Referring to FIG. 1, the image processor 10 is connected with a sensor group 30 for detecting manipulation of each specified manipulation device, which is a beforehand specified device in the manipulation device group.

In the present embodiment, the steering wheel, the shift lever, the GB, the CB, and the IG mechanism are specified as the specified manipulation devices. Correspondingly to the specified manipulation devices, the sensor group 30 includes a steering sensor 31, which detects manipulation of the steering wheel, a shift lever sensor 32, which detects manipulation of the shift lever, a GB sensor 33, which detects opening-and-closing of the GB, a CB sensor 34, which detects opening-and-closing of the CB, and an IG sensor 35, which detects manipulation of the IG mechanism.

The steering sensor 31 has a sensing electrode embedded in each of a right and left portions of the steering wheel gripped by right and left hands. When the steering wheel is gripped, the steering sensor 31 outputs a steering wheel manipulation signal to the image processor 10. The shift lever sensor 32 has a sensing electrode embedded in a portion of the shift lever gripped by a hand. When the shift lever is gripped, the shift lever sensor 32 outputs a shift lever manipulation signal to the image processor 10.

The GB sensor 33 includes a switch, which is energized or de-energized to activate an electric light of the GB when the GB is opened. The CB sensor 34 includes a switch, which is energized or de-energized to activate an electric light of the CB when the CB is opened. The GB sensor 33 outputs a GB manipulation signal to the image processor 10 when the GB is opened. The CB sensor 34 outputs a CB manipulation signal to the image processor 10 when the CB is opened.

The IG sensor 35 includes an ignition switch, which outputs an IG manipulation signal to the image processor 10 when an ignition key is turned to each of an accessories position, an ignition position, and an engine starting position.

In the present embodiment, in addition to the steering wheel, the shift lever, the GB, the CB, and the IG mechanism, the navi instruction portion and the AC instruction portion are further specified as specified manipulation devices.

The image processor 10 receives a navigation manipulation signal and an AC manipulation signal respectively via the navigation instruction portion and the AC instruction portion.

The image processor 10 determines whether a driver continually manipulates a specified manipulation device in accordance with a manipulation signal from the sensor group 30. The storage device 10a stores a program executed by the arithmetic unit 10c to perform a definite action information generation operation so as to specify detected continuous manipulation as a definite action, which a driver has performed, in accordance with a manipulation signal from a specified manipulation device.

<Definite Action Information Generating Operation>

Subsequently, the definite information generating operation executed by the arithmetic unit 10c of the image processor 10 will be described.

Figure 3:
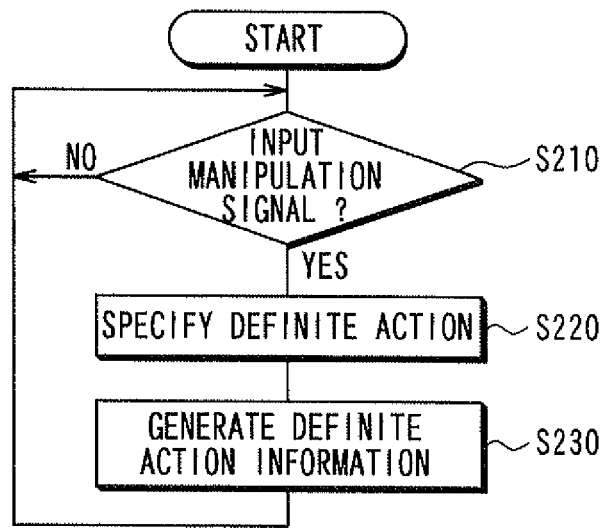
FIG. 3 is a flow chart showing a definite information generating operation.

FIG. 3 is a flow chart showing the definite action information generating operation.

The definite information generating operation is started at a predetermined starting time point before a driver enters a self-vehicle. For example, the starting time point is determined at a time point when a door of the self-vehicle is unlocked.

As shown in FIG. 3, when the definite action information generating operation is started, at S210, it is first determined whether a manipulation signal is inputted from the sensor group 30 or a specified manipulation device. When it is determined that a manipulation signal is not inputted, the operation is held in a standby mode until a manipulation signal is inputted. When it is determined that a manipulation signal is inputted, the processing proceeds to S220.

At S220, a continuous manipulation of a specified manipulation device, which is being performed by a driver, is specified as a definite action based on an inputted manipulation signal.

Specifically, in the present embodiment, when the steering wheel manipulation signal is inputted, the steering wheel continuous manipulation, in which a driver is manipulating the steering wheel, is specified as a definite action. Alternatively, when the lever manipulation signal is inputted, the shift lever continuous manipulation, in which a driver is manipulating the shift lever, is specified as a definite action. Further, when the IG manipulation signal is inputted, the IG mechanism continuous manipulation, in which a driver is manipulating the IG mechanism, is specified as a definite action.

In addition, when a manipulation signal is inputted from the GB sensor 33, the GB continuous manipulation, in which a driver is manipulating the GB, is specified as a definite action. When a manipulation signal is inputted from the CB sensor 34, the CB continuous manipulation, in which a driver is manipulating the CB, is specified as a definite action. In addition, when the navigation manipulation signal is inputted, the navigation continuous manipulation, in which a driver is manipulating the navigation device 21, is specified as a definite action. Alternatively, when the AC manipulation signal is inputted, the AC continuous manipulation, in which a driver is manipulating the airconditioner, is specified as a definite action.

Subsequently, at S230, definite action information is generated by associating the definite action specified in S220 with a specific start time, at which the definite action started, and a specific end time, at which the definite action ended. Thus, the definite action information is stored in a predetermined area of the memory 10b.

In the present embodiment, as shown in FIG. 7, a definite action information table, which specifies the continuous manipulation of each specified manipulation device, is beforehand stored in the memory 10b. When input of a manipulation signal starts, the present time point is stored as specific start time in a storage area of a specific action (continuous manipulation), which corresponds to the manipulation signal, in the definite action information table. When input of a manipulation signal ends, the present time point is stored as specific end time in a storage area of a specific action (continuous manipulation), which corresponds to the manipulation signal, in the definite action information table. In this way, the definite action information is generated and stored in the memory 10b.

Thereafter, the processing returns to S210 and repeats steps S210 to S230.

As described above, in the definite action information generating operation, a continuous manipulation, which is detected according to a manipulation signal obtained from a specified manipulation device, is specified as a definite action. Furthermore, the definite action information, which is generated by associating the definite action with the specific start time and specific end time of the definite action, is stored. In the present embodiment, the specific start time, the specific end time, and a time period (specific time period), in which the definite action is specified, are associated with each other as the definite action information for each content of the definite action.

<Action Estimating Operation>

Subsequently, the action estimating operation executed by the arithmetic unit 10c of the image processor 10 will be described.

Figure 4:
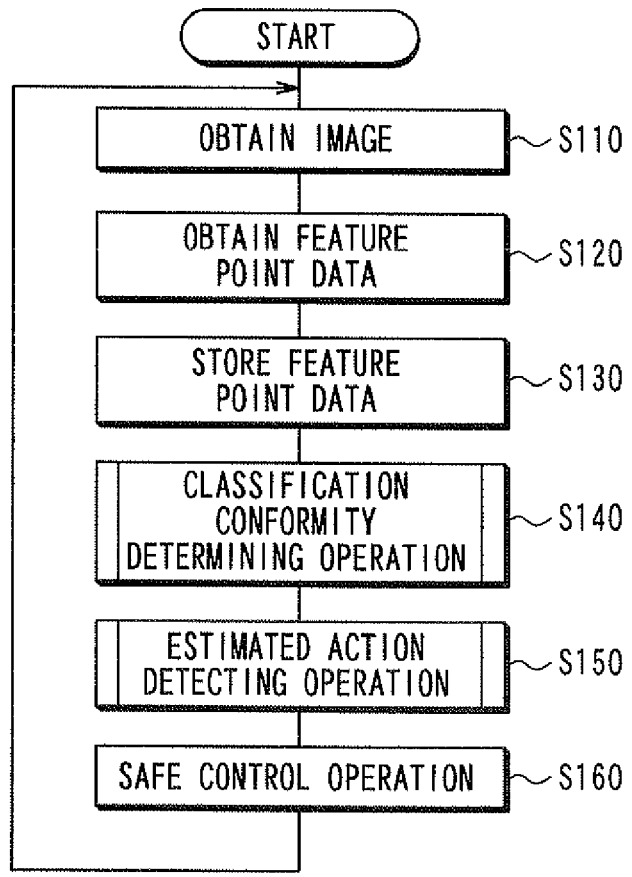
FIG. 4 is a flow chart showing an action estimation operation.

FIG. 4 is a flow chart showing the action estimating operation.

The action estimating operation is started at a predetermined starting time point before a driver enters a self-vehicle. For example, the starting time point is determined at a time point when a door of the self-vehicle is unlocked.

As shown in FIG. 4, when the action estimating operation is started, at S110, an image is first obtained from the image device 15. Subsequently, at S120, a feature list is compared with the image obtained at S110 so as to detect the coordinates (feature point data) of all feature points of a driver in the image.

For example, JP-A-2003-109015 discloses detection of a position of the feature point specified in an arm list, for example. Alternatively, JP-A-09-270010 discloses detection of a position of the feature point specified in a head list, for example. Therefore, detailed description of detection of the feature point is omitted.

At S130, all the obtained feature point data is associated with a time point, at which the feature point data is obtained, and stored in a predetermined area of the memory 10b. In this case, all the obtained feature point data is associated with a time point, at which the image is obtained. It is noted that the predetermined area is capable of storing at least a predetermined number N of all the feature point data obtained at S120 retroactively from the latest data. The predetermined number N is a natural number and may be set to a number of images, which can be obtained by using the image device 15 within one minute. Specifically, the predetermined number N may be 300, for example.

Subsequently, at S140, a classification conformity determining operation is performed. Specifically, feature point data detected in a period, in which a definite action is detected, is compared with an action estimation model corresponding to the definite action for each classification. Thereby, a classification conformity degree indicating a degree of conformity of a driver is determined for each classification.

At S150, a predetermined number of feature point data, which is stored in the predetermined area at S130, is compared with all action estimation models stored in the storage device 10a, retroactively from the latest data. The predetermined number is, for example, five cycles in the present action estimating operation. Thereafter, based on the comparison result and the classification conformity degree determined at S140, the estimated action detecting operation is performed to detect an estimated action.

Subsequently, at S160, a safe control operation is performed for safely operating a self-vehicle according to the estimated action detected in the estimated action detecting operation at S150.

Specifically, in the safe control operation according to the present embodiment, when the estimated action detected in the estimated action detecting operation at S150 is a dangerous action, a speaker of the navigation device 21 is caused to output a voice (alarm) and/or the navigation device 21 is caused to display a notice to let a user stop the currently performed dangerous action. The dangerous action is a specific action specified beforehand.

In the present embodiment, the dangerous action is a specific action, which may pose danger to a driving operation of a self-vehicle. Specifically, the dangerous action includes, for example, telephone manipulation, eating and drinking, passenger seat manipulation (continuous manipulation and a transition action), rearview mirror manipulation, GB manipulation, CB manipulation, and the like.

Thereafter, the processing returns to S110 and repeats steps S110 to S160.

<Classification Conformity Determining Operation>

Subsequently, the classification conformity determining operation performed at S140 of the action estimating operation will be described.

Figure 5:
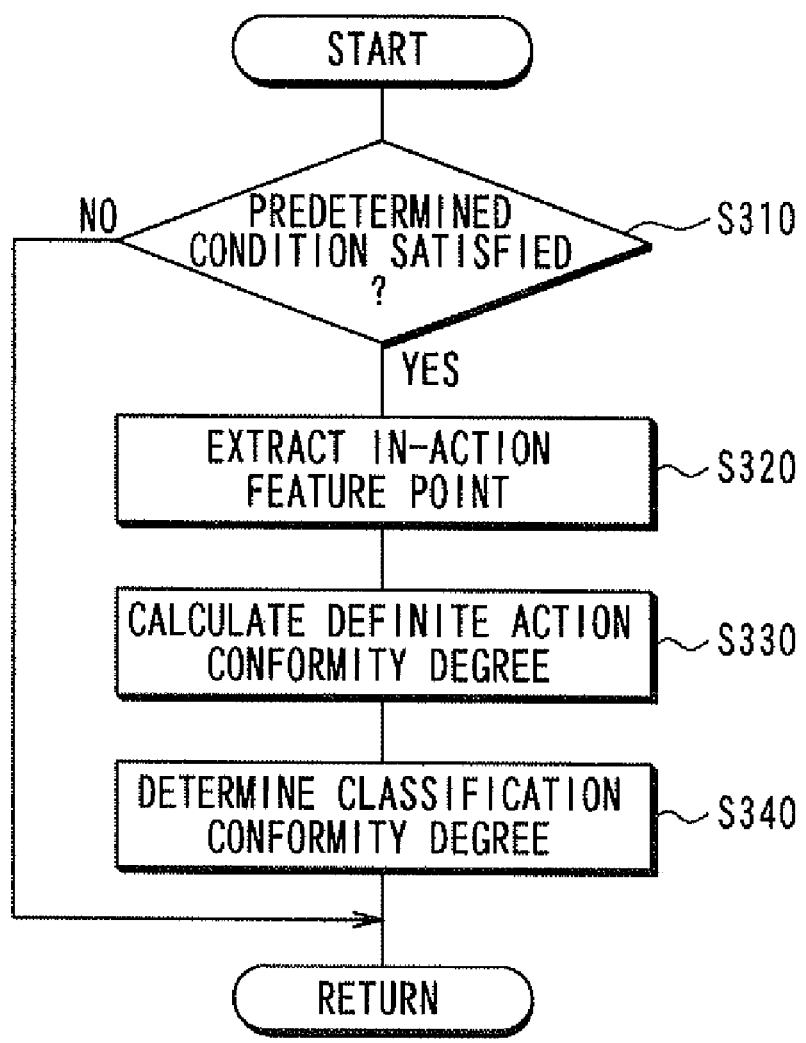
FIG. 5 is a flow chart showing a classification conformity determining operation.

FIG. 5 is a flow chart showing the classification conformity determining operation.

As shown in FIG. 5, in the beginning of the classification conformity determining operation, at S310, it is determined whether a predetermined condition is satisfied. In the present embodiment, the predetermined condition is satisfied when a number of items of the definite action information, which are generated in the definite information generating operation, becomes equal to or greater than a predetermined number. That is, the predetermined condition is satisfied when the predetermined number or more items of the definite action information are newly stored in a decision action information table. The predetermined condition may be satisfied when a predetermined number of items of the definite action information stored in the definite action information table are updated. As follows, each newly generated definite action information is denoted by new definite information, and an action content (content of a specified action) of a definite action of the new definite information is denoted by an in-action content.

When the predetermined condition is determined to be satisfied, at S310, the processing proceeds to S320.

At S320, feature point data (in-action feature point) associated with a time point in a period between the specific start time and the specific end time contained in each new definite information is extracted from feature point data stored in a predetermined area of the memory 10b. Specifically, at S320, for each new definite information, each feature point data detected at S120 in a specific period contained in each new definite information is extracted as an in-action feature point.

Subsequently, at S330, for each classification, each in-action feature point extracted at S320 is compared with each action estimation model corresponding to the definite action. Thereby, a definite action conformity degree indicating a degree of conformity between an in-action feature point and an action estimation model is determined.

Specifically, as a distance between a stationary position in each action estimation model and an in-action feature point becomes short, a definite action conformity degree increases. Each action estimation model corresponds to a continuous manipulation estimation model detectable as a definite action. Thus, all the definite action conformity degree corresponding to each of in-action feature points extracted at S320 are determined.

Further, at S340, a classification conformity degree is determined based on all the definite action conformity degree determined at S330.

Specifically, in the present embodiment, a sum (intermediate value) of the definite action conformity degree determined at S330 is determined for each classification. Further, a sum (total intermediate value) of the intermediate value, which is determined for each classification, is determined. In addition, a value calculated by dividing an intermediate value of each classification by a total intermediate value is determined as a classification conformity degree of the classification.

classification conformity degree $m$=intermediate value $m$/total intermediate value m is an index indicating one of classification.

Thereafter, the processing returns to S140 of the action estimating operation.

When the predetermined condition is determined not to be satisfied at S310, that is, when the predetermined number of items of the definite action information are not newly stored in the decision action information table, the processing returns to S140 of the action estimating operation.

That is, in the classification conformity determining operation, feature point data (in-action feature point) detected in the period, in which a definite action is detected, is compared with each action estimation model of the definite action. Further, a classification conformity degree (classification conformity weight) is determined. As a comparison coincidence degree becomes high, the classification conformity degree increases.

<Estimated Action Detecting Operation>

Subsequently, the estimated action detecting operation at S150 of the action estimating operation will be described.

Figure 6:
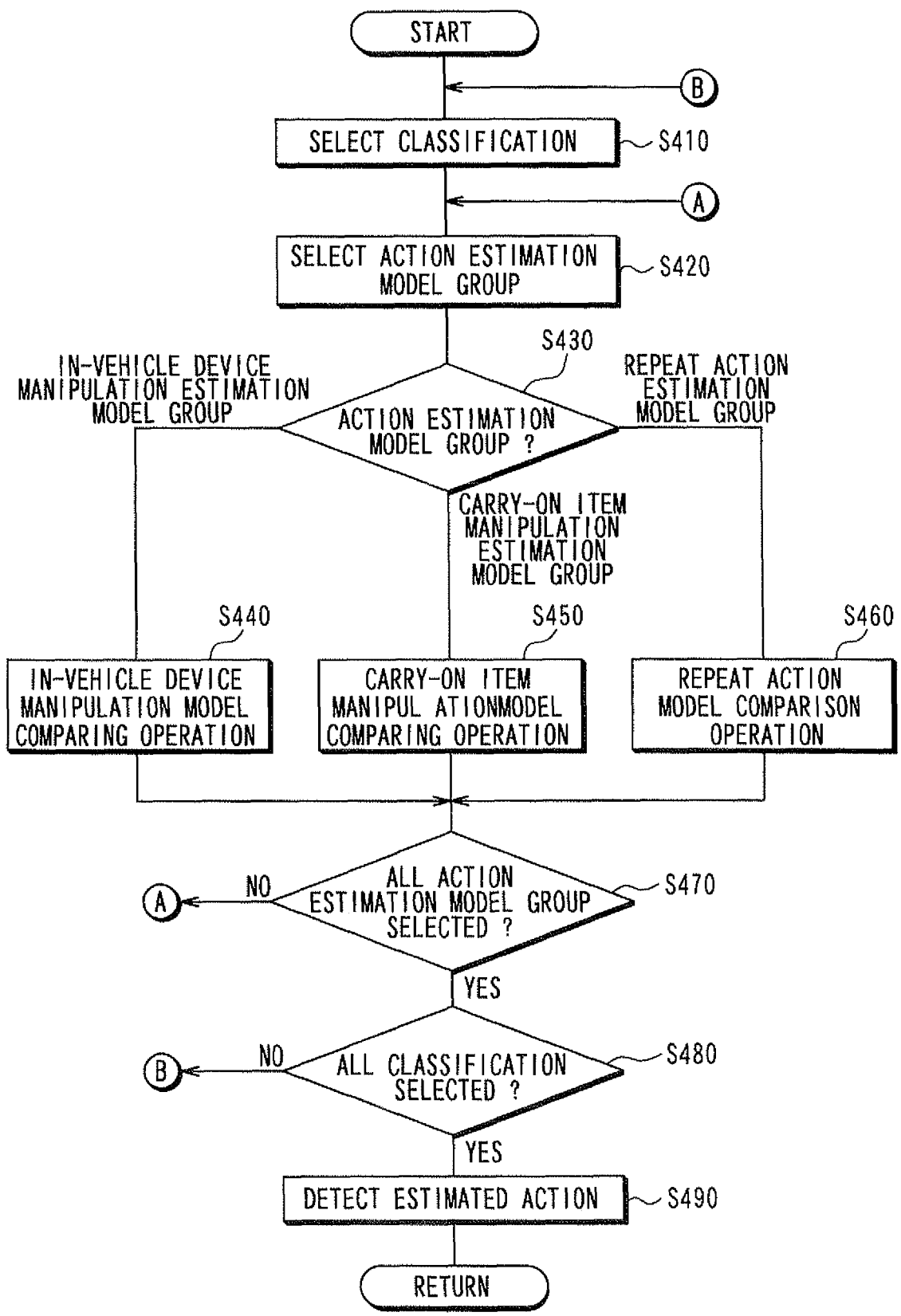
FIG. 6 is a flow chart showing an estimated action detecting operation.

FIG. 6 is a flow chart showing the estimated action detecting operation.

As shown in FIG. 6, at S410, in the beginning of the estimated action detecting operation, one classification is first selected from all classifications. Specifically, in the present embodiment, a classification A is selected immediately after beginning of the estimated action detecting operation. Thereafter, when the processing proceeds to S410, a subsequent classification is selected. Specifically, when the processing proceeds to S410, a classification B, a classification C . . . is selected in order.

Subsequently, at S420, one action estimation model group (comparison target), which is to be compared with feature point data, is selected from an in-vehicle device manipulation estimation model group, a carry-on item manipulation estimation model group, and a repeat action estimation model group contained in the classification selected at S410. In the present embodiment, the in-vehicle device manipulation estimation model group is selected, immediately after beginning of the estimated action detecting operation. Subsequently, when the processing proceeds to S420, the carry-on item manipulation estimation model group is selected. Thereafter, when the processing again proceeds to S420, the repeat action estimation model group is selected.

Subsequently, at S430, it is determined whether the comparison target selected at S420 is any one of the in-vehicle device manipulation estimation model group, the carry-on item manipulation estimation model group, and the repeat action estimation model group.

When the comparison target is determined to be the in-vehicle device manipulation estimation model group at S430, the processing proceeds to S440.

At S440, an in-vehicle device manipulation model comparing operation is performed. Specifically, feature point data is compared with each action estimation model contained in the in-vehicle device manipulation estimation model group. That is, feature point data is compared with each continuous manipulation estimation model and each transitional action estimation model. Thus, a comparison coincidence degree indicating a degree of conformity between each action estimation model and feature point data is determined.

More specifically, in the in-vehicle device manipulation model comparing operation according to the present embodiment, the comparison coincidence degree with respect to the action estimation model is determined based on a determination angle between the feature point data (locus), which continues with time progress, and a locus of each action estimation model. The comparison coincidence degree increases, as the determination angle becomes small.

When the comparison target selected at S420 is determined to be a carry-on item manipulation estimation model group at S430, the processing proceeds to S450.

At S450, a carry-on item manipulation model comparing operation is performed. Specifically, feature point data is compared with each action estimation model contained in the carry-on item manipulation estimation model group. That is, feature point data is compared with each carry-on item manipulation estimation model and each touch action estimation model. Thus, the comparison coincidence degree indicating a degree of conformity between each action estimation model and feature point data is determined for each action estimation model.

More specifically, in the carry-on item manipulation model comparing operation according to the present embodiment, the comparison coincidence degree of the action estimation model is determined based on a distance from feature point data (relative feature point), which is converted into a relative coordinate having a return point as a zero point, to the return point. The comparison coincidence degree increases, as the distance from the relative feature point to the return point becomes small.

More specifically, in the carry-on item manipulation model comparing operation according to the present embodiment, an action angle θ between a moving direction, in which feature point data continuously moves with time progress and an action direction from feature point data to a return point is determined. When the action angle θ is out of an allowable range, the comparison coincidence degree of the action estimation model is determined to be zero. Further, in the carry-on item manipulation model comparing operation, when a relative feature point is out of a return region or a pass-by region, the comparison coincidence degree of the action estimation model is determined to be 0.

When the comparison target selected at S420 is determined to be a repeat action estimation model group at S430, the processing proceeds to S460.

At S460, a repeat action model comparing operation is performed. Specifically, feature point data is compared with each action estimation model contained in the repeat action estimation model group. That is, feature point data is compared with each repeat action estimation model. Thus, the comparison coincidence degree indicating a degree of conformity between each action estimation model and feature point data is determined.

More specifically, in the repeat action model comparing operation according to the present embodiment, the comparison coincidence degree of the action estimation model is determined based on a shortest distance among all distance from feature point data (converted feature point), which is converted into a relative coordinate corresponding to each action estimation model, to a specific point contained in each action estimation model. The comparison coincidence degree increases, as the shortest distance from the converted feature point to the specific point becomes small.

In the repeat action model comparing operation, when the converted feature point is out of an allowable region contained in an action estimation model, a comparison coincidence degree is determined to be 0.

Subsequently, at S470, it is determined whether all the in-vehicle device manipulation estimation model group, the carry-on item manipulation estimation model group, and the repeat action estimation model groups are selected for the classification, which is selected at S410, at S420. When all the model groups are determined not to be selected, the processing returns to S420. Alternatively, when all the model groups are determined to be selected, the processing proceeds to S480.

At S480, it is determined whether it is selected for all the classification at S410. When it is determined that it is selected for all the classification, the processing returns to S410. Alternatively, when it is determined to be selected for all the classification, the processing proceeds to S490.

At S490, each comparison coincidence degree determined for each classification is multiplied by each classification conformity degree for each classification, and thereby the multiplied value is accumulated for each specific action corresponding to each action estimation model. Consequently, a specific action corresponding to a largest accumulated value of an action estimation model is detected as an estimated action.

Thus, the estimated action detecting operation is terminated, and the processing returns to S150 of the action estimating operation.

In the estimated action detecting operation, the comparison coincidence degree (comparison coincidence weight) is multiplied by the classification conformity degree determined in the classification conformity determining operation. Thereby, a possibility of a driver belonging to each classification, i.e., a reliability of an action estimation model for the classification is reflected to the comparison result between feature point data and each action estimation model. That is, a possibility of a driver belonging to each classification is incorporated into the comparison result between feature point data and each action estimation model. Thus, in the estimated action detecting operation according to the present embodiment, a comparison result between an action estimation model with high reliability and feature point data is regarded to be reliable in detection of an estimated action.

<Effect>

According to the action estimation system 1 of the present embodiment, a classification, to which the driver belongs, is regarded to be most important in detection of an estimated action. Thus, a specific action, which a driver performs at the highest possibility, is detectable as an estimated action.

Further, according to the action estimation system 1, an index for detecting an estimated action is determined by multiplying the comparison coincidence degree by the classification conformity degree (classification conformity weight). Therefore, a comparison result between an action estimation model with high reliability and feature point data can be steadily reflected to the index. That is, the comparison result can be steadily incorporated into the index.

Thus, according to the action estimation system 1 of the present embodiment, an erroneous detection resulting from a driver's height can be reduced, and a detection accuracy of an estimated action can be enhanced.

Further, the action estimation system 1 is configured to perform a safe control when a driver performs a dangerous action. Thereby, a safety operation of a driver can be maintained.

Other Embodiments

In the estimated action detecting operation of the above embodiment, at S490, a specific action having the highest accumulated value of the index value is detected as an estimated action. The index value is calculated by multiplying the comparison coincidence degree by the classification conformity degree (classification conformity weight) for each specific action. It is noted that the method for detecting an estimated action is not limited to the processing of S490. For example, a specific action, which corresponds to an action estimation model having a highest single index value, may be detected as an estimated action.

Further, in the estimated action detecting operation of the above embodiment, feature point data is compared with all action estimation models for each classification in detection of an estimated action. Alternatively, an action estimation model, which is compared in detection of an estimated action, may be included in one classification. However, in this case, feature point data needs to be compared with an action estimation model of a classification (specific classification) having a highest classification conformity degree.

In this manner, it suffices that an action estimation model of a specific classification is compared with feature point data. Therefore, an operation needed for detection of an estimated action can be reduced.

When feature point data is compared with an action estimation model of a specific classification in this manner, a classification conformity degree relative to a classification other than the specific classification may be set to 0, and an index value determined using the classification conformity degree may be set to 0.

At S490 in the estimated action detecting operation of the above embodiment, an index value, which is determined by reflecting a classification conformity degree to a comparison result, is obtained by multiplying a comparison coincidence degree by a classification conformity weight. It is noted that acquisition of the index value, which is determined by reflecting a classification conformity degree to a comparison result, is not limited to the processing of S490. For example, the index value may be obtained by adding a classification conformity degree to a comparison coincidence degree or may be obtained by another method.

Further, at S310 in the classification conformity determining operation of the above embodiment, the predetermined condition for determining a classification conformity degree is satisfied when the predetermined number or more items of definite action information is generated. It is noted that the predetermined condition is not limited to that of S310. For example, the predetermined condition may be satisfied when one item of the definite action information is newly generated. Alternatively, the predetermined condition may be satisfied when a definite action is continually performed for more than a predetermined period or when another predetermined state is formed.

The predetermined state may be formed when a specific action (after boarding action) performed after a driver climbs into a self-vehicle is specified as a definite action. The after boarding action is preferably at least one of an IG mechanism continuous manipulation, a steering wheel continuous manipulation, and a shift lever continuous manipulation.

In this manner, a comparison coincidence degree (classification conformity weight) is determined immediately after an occupant climbs into an automobile. Therefore, an erroneous detection of an estimated action can be reduced.

At S320 in the classification conformity determining operation of the above embodiment, feature point data associated with a time point in a period, in which a definite action is specified, is extracted as an in-action feature point from the feature point data stored in the memory 10b. It is noted that the method for generating an in-action feature point is not limited to the processing of S320. For example, when a definite action is specified on detection of feature point data, the definite action may be associated with the feature point data to be an in-action feature point.

In the definite action information generating operation according to the above embodiment, only a continuous manipulation of a specified manipulation device is determined as a definite action. It is noted that a specific action determined as a definite action is not limited to that in the above embodiment. For example, a transition action between specified manipulation devices may be determined to be a definite action.

In this case, when another manipulation signal is inputted within a predetermined period, such as 3 seconds, after one manipulation signal is inputted, a transition action between manipulation devices may be detected as a definite action. For example, when a lever manipulation signal is inputted to the image processor 20 within a predetermined period after a steering wheel manipulation signal is inputted to the image processor 20, a transition action from the steering wheel to the shift lever may be specified as a definite action. Alternatively, when a navigation manipulation signal is inputted to the image processor 20 within a predetermined period after a steering wheel manipulation signal is inputted to the image processor 20, a transition action from the steering wheel to the navigation device 21 may be specified as a definite action.

Further, at S160 in the action estimation processing according to the above embodiment, the safe control processing is performed such that an occupant is notified to stop a dangerous action via the speaker and the display device of the navigation device 21. It is noted that the safe control processing is not limited to that in the above embodiment. For example, when a dangerous action is detected as an estimated action, binding force of a seat belt of a self-vehicle may be increased. Alternatively, a control instruction may be outputted to the airconditioner control device 22 so as to blow cool air to an occupant, for example. Alternatively, in this case, a brake actuator, a throttle actuator, and a transmission may be controlled to stop a self-vehicle.

In the action estimation system 1 of the above embodiment, a classification is determined according to a height of a person. It is noted that the method for determining a classification is not limited to that of the processing of the above embodiment. For example, a weight, a seated height, a race, a nationality, and/or the like may be used for determining a classification. The race indicates a white race, a black race, a yellow-skinned race, and the like. The nationality includes a concept of a resident in a region such as Asia, Europe, and North America, and/or a resident in each country.

In the above embodiment, the action estimation system 1 is provided in an automobile. It is noted that the action estimation system 1 need not be provided in an automobile. For example, the action estimation system 1 may be provided in another movable object, such as an airplane, a train, or a two-wheeled vehicle.

In the above embodiment, the function produced by performing S110 in the action estimation processing is an example of an image acquisition unit. The function produced by performing S120 in the action estimation processing is an example of a feature point detection unit. The storage device 10a is an example of a model storage unit. The function produced by performing the definite action information generating operation is an example of a definite action detecting unit.

In the above embodiment, the function produced by performing S140 (classification conformity determining operation) in the action estimating operation is an example of a weight determining unit. The function produced by performing S150 (estimated action detecting operation) in the action estimating operation is an example of an action estimating unit. The function produced by performing S160 in the action estimating operation is an example of a safe control unit.

Summarizing the above description, in the action estimating apparatus, each time an image acquisition unit repeatedly obtains a photographic image of an occupant of a movable object, a feature point detection unit detects feature point data indicating a position of a feature point of the occupant in the photographic image. The feature point is at least one predetermined point on a person's body.

Further, in the action estimating apparatus, a model, which indicates a position or a locus of the feature point when a specific action is performed, is defined as an action estimation model for each specific action. A model storage unit stores the action estimation model of all specific action for each of two or more classification, which is beforehand specified according to a person's physical feature. A definite action detecting unit detects that definite action is performed by the occupant using a different method from comparison between the feature point data and the action estimation model. The specific action is an action possibly performed by an occupant. The definite action is at least one specific action beforehand specified.

In the action estimating apparatus, an in-action feature point is the feature point data detected by the feature point detection unit in a period in which the definite action is being performed. A weight determining unit compares the in-action feature point with each action estimation model of the definite action being detected and determines a classification conformity weight (classification conformity degree) such that the classification conformity weight increases as a degree of coincidence increases. That is, the classification conformity weight indicates a possibility that an occupant belongs to a classification, which includes the action estimation models.

In addition, an action estimating unit compares the feature point data with each action estimation model stored in the model storage unit. Thereby, the action estimating unit detects a specific action as an estimated action, wherein the specific action corresponds to the action estimation model, which is the highest in a conformity value, into which the classification conformity weight is incorporated.

That is, in the action estimating apparatus, an occupant is considered to be highly possibly included in the classification to which the action estimation model belongs, the action estimation model being high in the degree of coincidence with the definite action. Thus, the classification conformity weight (reliability for the action estimation model of the classification) is determined to be high. In the action estimating apparatus, the classification conformity weight is incorporated into the comparison result, and thereby the comparison result between an action estimation model, which is high in reliability, and the feature point data is recognized to be high in importance in detection of the estimated action.

Thus, in the action estimating apparatus, the classification, to which an occupant belongs, is high in importance in detection of the estimated action. Whereby, a specific action, which is performed by the occupant at highest possibility, can be detected as an estimated action. Therefore, the action estimating apparatus can reduce an erroneous detection resulting from an occupant's physical feature. As a result, detection accuracy of the estimated action can be enhanced.

When the action for manipulating a manipulation device mounted in the movable object is set as a definite action, the definite action detecting unit of the action estimating apparatus may preferably include a manipulation signal acquisition unit for obtaining a manipulation signal indicating that the manipulation device is being manipulated. Thus, the definite action detecting unit detects that definite action is being performed in accordance with the obtained manipulation signal.

When an automobile is assumed as a movable object, a steering wheel, a shift lever, a glove box, a console box, a navigation device, an airconditioner, and the like are considered as manipulation devices.

In the action estimating apparatus, the conformity value may be an index value, which is obtained by addition of a comparison coincidence degree between an action estimation model and feature point data to a classification conformity weight or an index value, which is obtained by multiplication of the comparison coincidence degree by the classification conformity weight. Alternatively, the conformity value may be a value, which is an accumulation of the index value for each definite action corresponding to each action estimation model.

According to the action estimating apparatus, the comparison result between the action estimation model high in reliability and the feature point data can be steadily reflected to, i.e., incorporated into the conformity value.

The action estimating unit of the action estimating apparatus may be configured to compare feature point data only with an action estimation model of a classification, which is the highest in the classification conformity weight, to determine each comparison coincidence degree as a conformity value.

According to the action estimating apparatus, the feature point data is compared only with the action estimation model of the classification (specific classification), which is the highest in the classification conformity weight. Therefore, a required operation in detection of the estimated action can be reduced.

In the action estimating unit, the weight determining unit may be configured to set a classification conformity weight of a specific classification, to which an action estimation model highest in degree of coincidence belongs, to be the highest value. In addition, the weight determining unit may be configured to set a classification conformity weight of a classification other than the specific classification to be 0.

In this case, the action estimating apparatus determines that an occupant belongs to the specific classification and detects the estimated action only using the comparison result between the action estimation model of the specific classification and feature point data.

Therefore, the action estimating apparatus can restrict a comparison result of an action estimation model being low in reliability and feature point data from being reflected to, i.e., incorporated into a detection result of an estimated action.

In the action estimating apparatus, the time point at which the weight determining unit determines the classification conformity weight may be a time point of detection of a definite action being performed or may be a time point of detection of a definite action being performed for a period equal to or greater than a predetermined period.

In the former case, the classification conformity weight is determined on detection that definite action is performed, and thereby the classification conformity weight can be changed to a suitable value according to an occupant's condition.

In particular, in the action estimating apparatus, when an after boarding action, which is an action to be performed immediately after an occupant climbs into a movable object, is specified as a definite action, the classification conformity weight is determined in response to the after boarding action of the occupant.

In this manner, an erroneous detection of an estimated action can be reduced immediately after an occupant climbs into a movable object. When an automobile is assumed as a movable object, the after boarding action preferably includes at least one of an action to manipulate an ignition key (switch), an action to manipulate a shift lever, and an action to manipulate a steering wheel.

In the latter case, the classification conformity weight is updated each time of detection of a definite action performed for more than a specified period. Thereby, unnecessary update of the classification conformity weight can be restricted.

A specific action of an occupant, which may exert an adverse effect on an operation of a movable object, may be set as a dangerous action. In this case, a safe control unit may perform a safe control for safely controlling the movable object when the estimated action is the dangerous action.

Thus, the action estimation apparatus is configured to perform a safe control when an occupant performs the dangerous action, and thereby a safety operation of a mobile object can be maintained.

In the action estimation apparatus, a physical feature may include at least one of a height, a weight, a seated height, a gender, a race, and/or the like, for example. The race may indicate a generally defined race such as a white race, a black race, a yellow-skinned race, and the like. In addition, the race includes a concept of a resident in a region such as Asia, Europe, and North America, and/or a resident in each country.

A program may function as each unit of the action estimating apparatus when executed by a computer.

Such a program can be stored in a computer readable medium such as a DVD-ROM, a CD-ROM, a hard disk, and/or the like and can be arbitrary loaded to a computer and executed.

The above processings such as calculations and determinations are not limited being executed by the image processor 10. The control unit may have various structures including the image processor 10 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. An action estimating apparatus comprising:
   an image acquisition unit configured to repeatedly obtain a photographic image of an occupant of a movable object;
   a feature point detection unit configured to obtain feature point data indicating a position of a feature point of the occupant in the photographic image in response to obtaining of the photographic image by the image acquisition unit, the feature point being at least one predetermined point of a person's body;
   a model storage unit configured to store action estimation models of all specific actions in each of at least two predetermined person's-physical-feature classifications specified according to a person's physical feature, each of the action estimation models defining a position or a locus of the feature point in each of the specific actions, which an occupant may perform;
   a definite action detecting unit configured to detect that a definite action is being performed by the occupant using a method different from comparison between the feature point data and the action estimation models, the definite action being at least one of the specific actions specified beforehand;
   a weight determining unit configured to compare an in-action feature point with each of the action estimation models of the definite action and determine a classification conformity weight indicating a possibility that the occupant belongs to one of the person's-physical-feature classifications, which include the action estimation models, such that the classification conformity weight increases as a degree of coincidence increases, the in-action feature point being the feature point data obtained by the feature point detection unit while the definite action detecting unit detects the definite action; and
   an action estimating unit configured to:
     compare the feature point data detected by the feature point detection unit with each of the action estimation models stored in the model storage unit to obtain a comparison result as a comparison coincidence degree; and
     detect an estimated action, which is a specific action corresponding to one of the action estimation models having a highest conformity value, the conformity value being obtained by incorporating the classification conformity weight determined by the weight determining unit into the comparison coincidence degree, wherein
   the at least two predetermined person's-physical-feature classifications include a first person's-physical-feature classification and a second person's-physical-feature classification different from each other according to a person's physical feature,
   the model storage unit is further configured to store a first action estimation model, which corresponds to the first person's-physical-feature classification, and a second action estimation model, which corresponds to the second person's-physical-feature classification,
   the weight determining unit is further configured to:
     compare, with the feature point data detected by the feature point detection unit, a first in-action feature point of the first action estimation model and a second in-action feature point of the second action estimation model;
     set a first classification conformity weight indicating a possibility that the occupant belongs to the first action estimation model;
     set a second classification conformity weight indicating a possibility that the occupant belongs to the second action estimation model; and
     determine that it is highly possible that the occupant belongs to the first person's-physical-feature classification instead of the second person's-physical-feature classification and set the first classification conformity weight to be greater than the second classification conformity weight when a degree of coincidence of the in-action feature point with the first action estimation model is higher than a degree of coincidence of the in-action feature point with the second action estimation model.

2. The action estimating apparatus according to claim 1, wherein the definite action includes manipulation of a predetermined manipulation device in the movable object,
   the definite action detecting unit includes a manipulation signal acquisition unit configured to obtain a manipulation signal indicating manipulation of the manipulation device, and
   the definite action detecting unit detects that the occupant is performing the definite action according to the manipulation signal obtained by the manipulation signal acquisition unit.

3. The action estimating apparatus according to claim 1, wherein the action estimating unit is configured to compare all the action estimation models stored in the model storage unit with the feature point data to obtain the conformity value, and
   the conformity value is an index value calculated by adding the classification conformity weight to the comparison coincidence degree or an index value calculated by multiplying the classification conformity weight by the comparison coincidence degree.

4. The action estimating apparatus according to claim 3, wherein the action estimating unit is configured to calculate an accumulation of the index value of the specific action corresponding to each of the action estimation models to obtain the conformity value.

5. The action estimating apparatus according to claim 1, wherein the action estimating unit is configured to compare the feature point data only with the action estimation models of one of the person's-physical-feature classifications, which is highest in the classification conformity weight determined by the weight determining unit, to obtain the comparison coincidence degree as the conformity value.

6. The action estimating apparatus according to claim 5, wherein the weight determining unit is configured to set the classification conformity weight of the one of the person's-physical-feature classifications to the highest value and set the classification conformity weight of a person's-physical-feature classification other than the one of the person's-physical-feature classifications to 0.

7. The action estimating apparatus according to claim 1, wherein the weight determining unit is configured to set the classification conformity weight on detection by the definite action detecting unit that the definite action is being performed.

8. The action estimating apparatus according to claim 1, wherein the weight determining unit is configured to set the classification conformity weight on detection by the definite action detecting unit that the definite action is being performed for a period equal to or greater than a predetermined period.

9. The action estimating apparatus according to claim 1, further comprising:
a safe control unit configured to perform a safe control for safely controlling the movable object when the estimated action estimated by the estimated action detecting unit is a dangerous action,
wherein the dangerous action is one specific action having a possibility to exert an adverse effect on an operation of the movable object when performed by the occupant.

10. The action estimating apparatus according to claim 1, wherein the physical feature is at least one of a height, a weight, a seated height, a gender, a race of a person.

11. A non-transitory computer readable medium comprising instructions being executed by a computer, the instructions being for causing the computer to function as each unit according to claim 1.

12. The action estimating apparatus according to claim 1, wherein the physical feature is a height of a person,
the first person's-physical-feature classification is a first height classification,
the second person's-physical-feature classification is a second height classification,
the first action estimation model corresponds to the first height classification,
the second action estimation model corresponds to the second height classification,
the weight determining unit is further configured to:
compare the first in-action feature point of the first action estimation model and the second in-action feature point of the second action estimation model;
set the first classification conformity weight indicating a possibility that the occupant belongs to the first height classification;
set the second classification conformity weight indicating a possibility that the occupant belongs to the second height classification; and
determine that it is highly possible that the occupant belongs to the first height classification and set the first classification conformity weight to be greater than the second classification conformity weight when a degree of coincidence of the in-action feature point with the first action estimation model is higher than a degree of coincidence of the in-action feature point with the second action estimation model.

13. The action estimating apparatus according to claim 1, wherein the physical feature is at least one of a height, a weight, and a seated height of a person.

* * * * *